(12) United States Patent
Haag et al.

(10) Patent No.: US 8,783,959 B2
(45) Date of Patent: Jul. 22, 2014

(54) BEARING CAGE HAVING LIPOPHOBIC OR OLEOPHOBIC SURFACE(S)

(71) Applicant: Aktiebolaget Skf, Göteborg (SE)

(72) Inventors: Cornelia Haag, Aubstadt (DE); Ingo Schulz, Gerolzhofen (DE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/709,186

(22) Filed: Dec. 10, 2012

(65) Prior Publication Data

US 2013/0163908 A1   Jun. 27, 2013

(30) Foreign Application Priority Data

Dec. 22, 2011   (DE) .......................... 10 2011 088 232

(51) Int. Cl.
*F16C 33/66* (2006.01)
*F16C 33/56* (2006.01)
*F16C 33/44* (2006.01)

(52) U.S. Cl.
CPC ......... *F16C 33/6681* (2013.01); *F16C 2202/60* (2013.01); *F16C 33/565* (2013.01); *F16C 33/445* (2013.01)
USPC .......................................... 384/470; 384/573

(58) Field of Classification Search
USPC ......... 384/462, 470, 523, 527, 534, 572, 573, 384/576, 614, 625; 29/898.07, 898.08, 29/898.065, 898.067, 898.12; 427/569; 428/131, 327
See application file for complete search history.

(56) References Cited

U.S. PATENT DOCUMENTS

| | | | | |
|---|---|---|---|---|
| 2,553,742 | A | * | 5/1951 | Bloch ...................... 123/184.61 |
| 6,088,613 | A | * | 7/2000 | Unger ............................. 600/420 |
| 6,676,132 | B1 | * | 1/2004 | Takebayashi et al. ......... 277/560 |
| 6,911,298 | B2 | * | 6/2005 | Ide et al. .................... 430/270.1 |
| 7,174,625 | B2 | * | 2/2007 | Satoh ............................ 29/898.09 |
| 2002/0061386 | A1 | * | 5/2002 | Carson et al. ................. 428/131 |
| 2009/0326279 | A1 | * | 12/2009 | Tonkovich et al. ........... 568/487 |
| 2010/0068434 | A1 | * | 3/2010 | Steele et al. .................. 428/36.9 |
| 2010/0195946 | A1 | * | 8/2010 | Zhou et al. .................... 384/462 |
| 2011/0217544 | A1 | * | 9/2011 | Young et al. .................. 428/327 |

FOREIGN PATENT DOCUMENTS

| | | |
|---|---|---|
| DE | 102010019945 A1 | 11/2011 |
| JP | 60255895 A * | 12/1985 |
| JP | 2007032806 A | 2/2007 |

(Continued)

OTHER PUBLICATIONS

Jan Zimmerman, Michael Rabe, George R.J. Artus and Stefan Seeger Patterned Superfunctional Surfaces Based on a Silicone Nanofilament Coating Soft Matter, The Royal Society of Chemistry, 2008, vol. 4, pp. 450-452.

(Continued)

*Primary Examiner* — Marcus Charles
(74) *Attorney, Agent, or Firm* — Bryan Peckjian; SKF USA Inc. Patent Department

(57) ABSTRACT

A bearing cage has an annular structure with a plurality of pockets defined therein. At least one first surface area of the annular structure is made from, or is coated with, a first material having lipophobic and/or oleophobic properties. A rolling-element bearing includes this bearing cage, a plurality of roller bodies respectively disposed in the pockets, and a lubricant that forms a contact angle of at least 90° when disposed on the first material.

20 Claims, 2 Drawing Sheets

(56) References Cited

FOREIGN PATENT DOCUMENTS

| | | |
|---|---|---|
| JP | 2009121531 A | 6/2009 |
| JP | 2009180367 A | 8/2009 |
| JP | 2009281395 A | 12/2009 |
| JP | 2010190272 A | 9/2010 |
| JP | 2010236621 A | 10/2010 |
| JP | 2011241860 A | 12/2011 |
| WO | WO 2005061129 A1 * | 7/2005 |
| WO | WO 2008018028 A2 * | 2/2008 |
| WO | WO2008105375 A1 | 9/2008 |
| WO | WO2009015855 A1 | 2/2009 |

OTHER PUBLICATIONS

Anish Tuteja, Wonjae Choi, Joseph M. Mabry, Gareth H. McKinley and Robert E. Cohen Robust Omniphobic Surfaces PNAS, Nov. 25, 2008, vol. 105, No. 47, pp. 18200-18205.

* cited by examiner

US 8,783,959 B2

BEARING CAGE HAVING LIPOPHOBIC OR OLEOPHOBIC SURFACE(S)

CROSS-REFERENCE

This application claims priority to German patent application no. 10 2011 088 232.4 filed on Dec. 12, 2011, the contents of which are fully incorporated herein by reference.

TECHNICAL FIELD

The present invention generally relates bearing cages, or to segments or sections thereof, for use in rolling-element bearings, as well as to rolling-element bearings.

BACKGROUND

Rolling-element bearings are lubricated in order to reduce friction and wear during operation. For example, oil, grease or another friction-reducing lubricant is disposed within the bearing, in order to prevent or reduce wear caused by rolling friction and sliding friction. In order to block the lubricant from leaking out of the bearing and thus from no longer being available in sufficient quantities at contact points requiring lubrication, one or more seals may be used disposed in or around the bearing.

However, even if the seal(s) reliably retain(s) the lubricant between the bearing rings, increased wear can result if the lubricant cannot reach the to-be-lubricated contact points between the bearing ring or the raceway and the rolling elements due to the geometry of the bearing cage, or if the lubricant reaches these contact points in insufficient quantities.

Known attempts to solve this problem have designed the bearing cage to include special reservoirs for the lubricant.

But, a long-felt need continues to exist to ensure reliable lubrication and achieve bearings with long service lives and/or low maintenance requirements.

SUMMARY

It is an object of the present teachings to disclose techniques for improving the lubrication conditions within a bearing having a bearing cage.

In one aspect of the present teachings, a bearing cage (or just a segment/section of a bearing cage) for a rolling-element bearing has at least one surface region or area that is made from, or is coated with, a material having lipophobic and/or oleophobic properties.

In such embodiments, the bearing cage is preferably designed such that one or more lipophobic and/or oleophobic areas (regions) cause a lubricant, e.g., oil or grease, to move to and/or be concentrated at one or more locations (e.g., contact points) requiring lubrication. That is, the lipophobic and/or oleophobic area(s) (region(s)) preferably repel the lubricant, or at least the lubricant adheres less readily to the lipophobic and/or oleophobic areas (regions) than to the locations (e.g., contact points) requiring lubrication. This effect preferably promotes movement of the lubricant towards the locations (e.g., contact points) requiring lubrication.

In the present specification, the term "lipophobic property" is intended to mean that the material repels grease, or that grease adheres less strongly to such a material than to one or more other materials forming one or more portions (surfaces) of the bearing cage. The same applies to the term "oleophobic property" with regard to oils.

Further objects, embodiments, advantages and designs of the present teachings will be explained in the following, or will become apparent, with the assistance of the exemplary embodiments and the appended Figures.

DETAILED DESCRIPTION OF THE INVENTION

Figure 1:
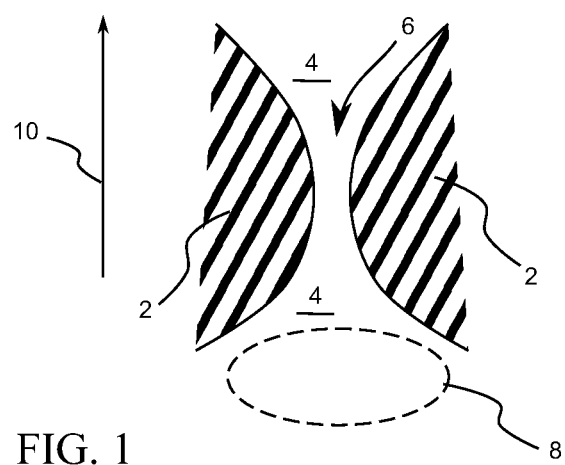
FIG. 1 shows a conceptual design of a representative lubricant transport channel formed on a surface of a bearing cage.

In certain aspects of the present teachings, the term "contact angle" may be used, for example, to determine or characterize the degree of lipo- or oleophobicity of a particular material relative to a particular lubricant (e.g., grease or oil). More specifically, the contact angle is defined as the angle formed between (i) a surface of a solid and (ii) a surface of a droplet of oil or grease disposed on the surface. The contact angle characterizes, or provides a quantitative measure of, the wettability of the oil or grease on the surface. Therefore, the size of the contact angle between the liquid and the solid surface depends on the amount of interaction between the two materials at the contact surface. The smaller this interaction is, the larger the contact angle is. When determining the contact angle, a droplet of the fluid (lubricant) is allowed to rest on the solid surface and is surrounded by gas. The contact angle is the angle formed by the liquid at the point where the solid, liquid and gaseous phases meet.

Certain properties of the surface of the solid—such as for example the surface energy—can be derived from the determination of the contact angle.

In the present teachings, the following terminology will be used. If an oil (liquid/fluid) exhibits a relatively small contact angle (e.g., less than 90°) on the solid surface, the surface will be called oleophilic, whereas a contact angle of 90° and greater means that the solid surface is oleophobic, and for even larger contact angles, the solid surface may be called superoleophobic. The same angular ranges and terminology are applicable in an analogous manner for lipophobic surfaces or materials with respect to grease.

Oleo- and lipophobic surfaces according to the present teachings may be either made from one or more oleophobic or lipophobic substances, or coated (covered) with one or more oleophobic or lipophobic substances.

Lipophobic and/or oleophobic materials according to certain aspects of the present teachings may advantageously comprise nanofilaments, e.g., silicone nanofilaments. Suitable lipo- and/or oleophobic properties can be achieved for example by the introduction of chlorine and/or fluorine into silicone nanofilaments. Polymethylsilsesquioxane nanofilaments, for example, are suitable lipo-/oleophobic materials in accordance with the present teachings.

Silicone nanofilaments can have, for example, a diameter of about 5 nm (more generally about 1-10 nm) and a length of several micrometers (more generally about 1-10 μm). They may be made from a member of the silane family. The chemical structure of such nanofilaments is the same as silicones in general. However, due to their nanostructure, the nanofilaments have, in certain aspects, different (sometimes significantly different) physical and/or chemical properties. As was just mentioned, the chemical structure of silicone nanofilaments corresponds to that of the silicones. Silicon atoms are bound to one another by oxygen atoms. If more than two oxygen atoms serve as bridging atoms, three-dimensional networks are formed. The fourth binding site of the silicon atom preferably may be saturated with an organic residue or radical.

Under certain conditions, solid silicone bodies do not form on surfaces during synthesis, but instead small filaments are formed that are only a few nanometers thick and may be only several tens of nanometers long, although longer nanofilaments are within the scope of the present teachings as mentioned above. Silicone nanofilaments can for example be manufactured from the gaseous phase in one representative method. In this case, trichlorosilane may be vaporized in a reaction chamber at a precisely set humidity, and the resulting mixture is exposed to a substrate for several hours. It should be noted that the concentration of trichlorosilane and humidity is very precisely set; otherwise the condensation reaction will not occur, i.e. the silicone will form, but not the nanofilaments.

Silicone nanofilaments have diverse, at least in part extreme properties, which can switch to the extreme opposite through subsequent chemical modification. Thus, surfaces coated with silicone nanofilaments are also extremely water-repellent (superhydrophobic). As was explained above, this property is described or characterized by the contact angle, which in the case of silicone nanofilament layers for water may be up to about 170°. In this case, even if the surface is disposed at only a small angle (incline) to the horizontal, e.g. it is inclined by only 2° or more, water beads will readily form and immediately roll off the surface due to gravity and the extremely low wettability of the surface.

The lipophobic or oleophobic materials used in the present teachings may also be (super)amphiphobic. That is, such materials exhibit the property of being both (i) hydrophobic/superhydrophobic (i.e. water-repellent) and (ii) oleophobic/superoleophobic and/or lipophobic/superlipophobic (i.e. oil- and/or grease-repellent). Methods for manufacturing such materials as well as characterization of their properties can be found in J. Zimmermann et al., "Patterned superfunctional surfaces based on a silicone nanofilament coating", Soft Matter, The Royal Society of Chemistry, 2008, vol. 4, pp. 450-452, which is incorporated herein by reference.

According to some exemplary embodiments of the present teachings, the material having oleo- and/or lipophobic properties is a nanofiber or nanofilament material derived from a silane, preferably a trichlorosilane, even more preferably a perfluorooctyltrichlorosilane (PFOTS). The silane can be applied to or deposited onto an elastomer substrate that has been activated with an oxygen plasma.

The following should be noted with regard to PFOTS: Silanes are a group of chemical compounds that consist of a silicon backbone and hydrogen. Silanes can have a branched structure (iso- and neo-silanes) or linear structure (n-silanes). The silane derivatives of interest here formally arise from substitution of the hydrogen atoms with halogens, oxygen, nitrogen and carbon, or groups containing these elements. Of note here are the chlorosilanes: monochlorosilane ($SiH_3Cl$), dichlorosilane ($SiH_2Cl_2$), trichlorosilane ($SiHCl_3$), and tetrachlorosilane ($SiCl_4$).

In particular, perfluorooctyltrichlorosilane (PFOTS) is noteworthy as a coating material. A coating having a silicone nanofilament without further modification is highly hydrophobic and oleophilic. Plasma treatment of the surface produces a wettability for water as well as for oil (super-amphiphilic property). Re-functionalization with octadecyltrichlorosilane (OTS) would restore the original hydrophobicity of the silicone nanofilaments, but the oleophilicity would be increased. If perfluorooctyltrichlorosilane (PFOTS) is used in the re-functionalization, the coating will be repellent to polar liquids as well as to non-polar liquids (i.e. the superamphiphobic property, i.e. omniphobicity, is generated).

Furthermore, reference is made to the article by A. Tuteja et al. "Robust omniphobic surfaces" in PNAS, 25 Nov. 2008, Vol. 105, No. 47, pp. 18200-18205, which is also incorporated herein by reference, and which contains further information for producing oleophobic, lipophobic, and omniphobic surfaces suitable for use with the present teachings. In this reference, fluorinated polyhedral oligomeric silesquioxanes (fluorodecyl POSS) in particular are used.

In certain exemplary embodiments of the present teachings, the surface of a bearing cage, or one or more segment(s) or section(s) thereof, may partially be made from, or coated with, any of the oleophobic and/or lipophobic materials described herein and partially made from, or coated with, another material(s) having non-oleophobic or non-lipophobic properties, i.e. having lesser repellent properties than the oleophobic and/or lipophobic material. In this case, the lubricant will prefer to reside on the area(s) of the bearing cage whose surface is made from the material having non-oleophobic or non-lipophobic properties (or lesser oleophobic and/or lipophobic properties), because the oleophobic and/or lipophobic areas will repel the lubricant to a greater degree.

Thus, in such embodiments, it is possible to control or influence the location and/or movement the lubricant by suitably dimensioning or patterning the respective surface areas. By laying-out patterns on the surface of the bearing cage that aid in directing or channeling lubricant away from areas that do not require lubrication to areas requiring constant or significant amounts of lubrication, more effective lubrication conditions can be achieved and the service life of the rolling-element bearing can be lengthened, without increasing maintenance requirements.

For example, one or more surfaces (surface areas) of a multi-piece or one-piece bearing cage may be at least partially coated with, or formed from, an oleophobic and/or lipophobic material, or the cage may be entirely or partially manufactured from the oleophobic and/or lipophobic material. For example, the entire outer circumferential surface of the cage or only certain sections of the circumferential surface could be coated with the oleophobic and/or lipophobic material, while the inner surface or only certain sections of the inner surface may be made from a different material having lower or lesser oleophobicity or lipophobicity, in order to thereby advantageously influence the flow behavior of the lubricant within the bearing. Preferably, the flow behavior of the lubricant is designed in such a way that the lubricant can reach the contact surface to be lubricated, e.g., by capillary action.

In order to achieve the aforementioned effects in exemplary embodiments wherein only portions of the surface of a cage blank or a cage of a different material are coated with the oleophobic and/or lipophobic material after the preparation or manufacture of the cage, the coating (pattern) can be produced for example using a mask. In this case, the mask is first disposed or deposited (e.g., printed or stenciled) on the surface areas that are not to be coated or covered with the oleophobic and/or lipophobic material, the surface of the bearing cage is then coated with the oleophobic and/or lipophobic material and then the mask is removed, thereby leaving the desired pattern of oleophobic and/or lipophobic material. Wax, for example, can be used as the material for the mask.

In alternate exemplary embodiments of the present teachings, in order to achieve the desired oleophobic and/or lipophobic properties, the surface of one or more portions of the cage may be chemically and/or physically modified after the cage has been formed by subjecting the surface (or only one or more portions thereof) to a chemical or physical treatment. Therefore, a less oleophobic and/or less lipophobic material may be transformed or converted into a more oleophobic and/or more lipophobic material by this post-manufacture processing.

In some exemplary embodiments of the present teachings, the oleophobic and/or lipophobic material is preferably disposed (only) outside the pockets of the cage, wherein the surface of the pockets of the cage are coated with, or are made from, a less oleophobic and/or less lipophobic material, or even an oleophilic and/or lipophilic material. By using materials and/or coatings having different properties in this matter, the lubricant can be caused to concentrate within the cage pockets due to the different surface tensions in the different regions, so that the rolling elements (bodies) and/or bearing races (rings) can always introduce or transport sufficient lubricant from the region of the cage pockets into the gaps and/or to contact points in need of lubrication.

For example, the bearing cage could be made from a less oleophobic and/or less lipophobic material, or even an oleophilic and/or lipophilic material. Then, after formation of the bearing cage structure, portions of the bearing cage outside of the pockets may be either coated with a more oleophobic and/or lipophobic material, or such portions could be subjected to a chemical or physical post-processing that causes such portions to become more oleophobic and/or lipophobic.

In some exemplary embodiments of the present teachings, at least one predetermined surface region of the cage is made from a less oleophobic and/or less lipophobic material, or even an oleophilic and/or lipophilic material. The predetermined surface region(s) is (are) bounded on two opposite sides by the above-described oleophobic and/or lipophobic material, to thereby define a channel on the surface of the bearing cage, as will be further discussed below with respect to FIG. 1. Such a channel enables grease or oil to be selectively transported (moved) along the predetermined surface region(s), e.g., to one or more contact points in need of lubrication. By appropriately dimensioning/designing the predetermined surface region (i.e. the channel), a capillary effect or action can be created, so that lubricant is transported along the predetermined surface region without the assistance of any externally-applied forces (and even in opposition to gravity). Thus, in such exemplary embodiments, a directed transport of lubricant along the surface of the bearing cage can be achieved.

In further exemplary embodiments of the present teachings, the oleophobic and/or lipophobic region(s) of the bearing cage are preferably designed such that the lubricant (e.g., grease or oil) will form a contact angle on the surface thereof with the grease or oil that is greater than 90°, preferably greater than 120°, and even more preferably greater than 150°. Contact angles in the range of 160-175° are possible with certain oleophobic and/or lipophobic materials according to the present teachings.

A preferred exemplary embodiment will not be explained in more detail below with reference to the drawings.

FIG. 1 shows a section of a surface of a bearing cage or of a segment of a bearing cage. A predetermined surface region 4 is made from, or is coated with, a less oleophobic and/or less lipophobic material, or even an oleophilic and/or lipophilic material. The predetermined surface region 4 is bounded on two opposite sides by surface regions 2, which are made from or coated with an oleophobic and/or lipophobic material according to the present teachings, in order to effect a directed lubricant transport along or through the predetermined surface region 4, i.e. along a tapered channel 6. For example, the tapered channel 6 may be designed so that lubricant will be conveyed along the tapered channel 6 due at least in part to capillary action. If, for example, lubricant is located in region 8 (e.g., a lubricant reservoir or other surface area were lubricant may passively collect during operation of the bearing), the lubricant will be transported in the transport direction 10 through the tapered channel 6. The tapered channel 6 preferably leads to one or more contact points or other location(s) within the rolling-element bearing in need of lubrication.

The width of the tapered channel 6 is preferably set so that lubricant will be caused to move from the region 8 where lubricant collects to the desired location(s), e.g., one or more contact points, at least in part by capillary action. The actual width necessary to achieve this effect will depend, at least in part, upon the lubricant-air surface tension, the contact angle that the lubricant forms with the oleophobic and/or lipophobic material and the density and/or viscosity of the lubricant. The person of ordinary skill in the art can suitably set the width by using standard capillary action equations after selecting the particular oleophobic and/or lipophobic material and the particular lubricant that will be utilized in accordance with the present teachings.

Figure 2:
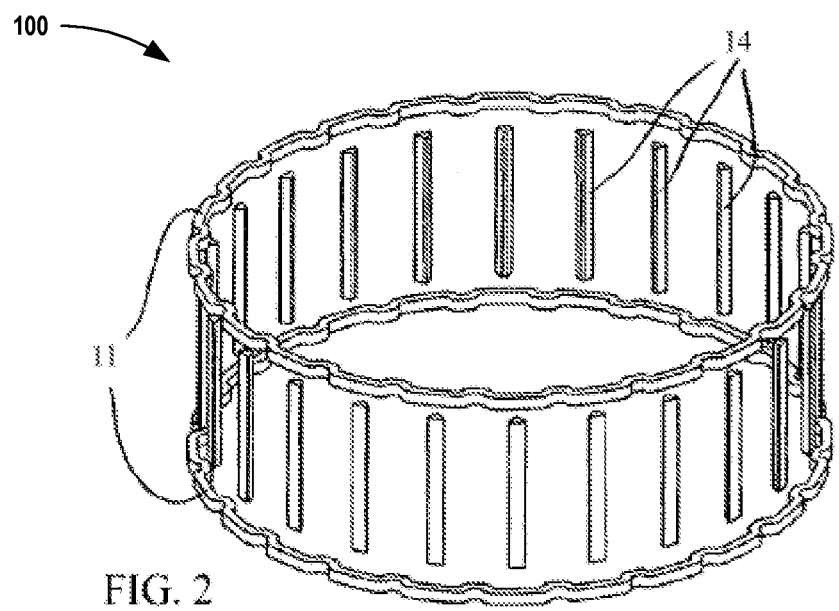
FIGS. 2 and 3 show a representative bearing cage according to the present teachings in an exploded view and in an assembled view, respectively.
Figure 3:
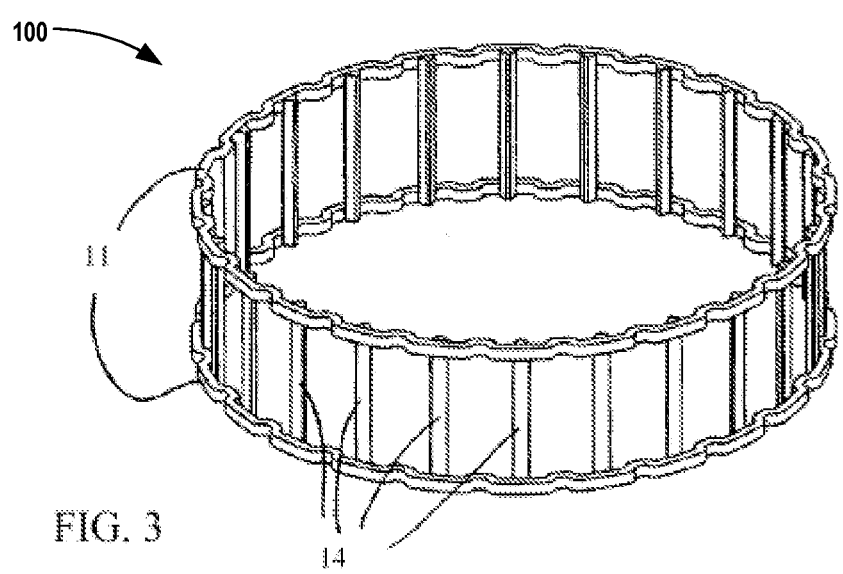

FIGS. 2 and 3 show a representative bearing cage 100 according to the present teachings in an exploded view and in an assembled view, respectively. In particular, a multi-part bearing cage is shown that comprises two at least substantially annular rings 11 and a plurality of bridges or strips 14 that are affixed to, and maintain the axial separation, of the two annular rings 11. Pockets for respectively receiving/accommodating a plurality of rolling elements (roller bodies), e.g., cylindrical rollers in the present embodiment, are defined between each two adjacent bridges 14 and the portions of the annular rings 11 at each axial end of the two adjacent bridges 14.

The bearing cage having the rolling elements disposed therein may be disposed between a bearing outer ring (race) and a bearing inner ring (race) in order to form a rolling-element bearing according to the present teachings.

As will be appreciated, one or more of the surface areas of the bearing cage of FIGS. 2 and 3 may be formed from, or coated with, any one or more of the oleophobic and/or lipophobic materials disclosed herein. For example, as was disclosed above, only surfaces outside of the pockets may be coated with the oleophobic and/or lipophobic material(s) in order to influence the movement of the lubricant into the pocket areas. In addition or in the alternative, one or more lubricant transport channels may be defined on one or more surfaces of the bearing cage by appropriately patterning the oleophobic and/or lipophobic material(s) thereon.

Naturally, in addition to cylindrical roller bearings, the present teachings are applicable to any type of rolling-element bearing, e.g., deep groove or angular contact ball bearings, barrel bearings, or ball bearings as well as needle bearings. The geometry of the cages or cage segments can be matched to the respective roller elements and bearing designs in a particularly flexible manner, since an additional degree of freedom is available for the optimization of the lubrication.

Representative methods for manufacturing a bearing cage or a bearing cage segment for a rolling-element bearing, may include:

preparing a bearing cage blank or a bearing cage segment blank made of a first material; and disposing a second material on at least one part of a surface of the bearing cage blank or of the bearing cage segment blank, wherein the second material is more lipophobic and/or oleophobic than the first material.

The disposing step may include:

coating (e.g., by printing, by vapor deposition, using a stencil, etc.) one or more surface regions of the bearing cage blank or the bearing cage segment with a masking material in order to obtain a masked surface having a mask pattern;

coating the masked surface with the second material; and preferably or optionally thereafter removing the masking pattern.

In any of these methods, the second material may be any of the lipophobic and/or oleophobic materials discussed above, such as e.g., silocone nanofilaments made from a member of the silane family.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cages and methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

2 Selected part of a surface
4 Predetermined surface region
6 Tapered channel
8 Lubricant region
10 Transport direction

The invention claimed is:

1. A bearing cage comprising:

an annular structure having a plurality of pockets defined therein, wherein at least one first surface area of the annular structure is made from, or is coated with, a first material having lipophobic, oleophobic, or both lipophobic and oleophobic properties, wherein at least one second surface area of the annular structure is coated with a second material that is less lipophobic, less oleophobic, or both less lipophobic and less oleophobic than the first material.

2. The bearing cage according to claim 1, wherein the first material is disposed on one or more surfaces at least substantially, or entirely, outside the pockets.

3. The bearing cage according to claim 2, wherein the second material is bounded on two opposite sides by the first material so as to define a channel configured to transport a hydrophobic lubricant.

4. The bearing cage according to claim 3, wherein the lubricant transport channel is tapered at least in part.

5. The bearing cage according to claim 4, wherein a first end of the lubricant transport channel leads to a point or location in need of lubrication.

6. The bearing cage according to claim 5, wherein the point or location in need of lubrication is a contact point configured to contact a roller body or a bearing race.

7. The bearing cage according to claim 6, wherein a second end of the lubricant transport channel is adjacent to, or in fluid communication with, a location configured to collect lubricant.

8. The bearing cage according to claim 7, wherein the lubricant transport channel has a width sufficiently narrow to cause lubricant to move through it by capillary action.

9. The bearing cage according to claim 8, wherein a plurality of the lubricant transport channels respectively lead to a plurality of contact points.

10. The bearing cage according to claim 9, wherein the first material comprises nanofilaments.

11. The bearing cage according to claim 10, wherein the nanofilaments are silicone nanofilaments made from a silane.

12. The bearing cage according to claim 11, wherein the silicone nanofilaments are made from a trichorosilane.

13. The bearing cage according to claim 12, wherein the silicone nanofilaments are made from perfluorooctyltrichlorosilane (PFOTS).

14. The bearing cage according to claim 10, wherein the nanofilaments are made from polymethylsilsesquioxane.

15. The bearing cage according to claim 10, wherein the nanofilaments are made from a fluorinated polyhedral oligomeric silesquioxane.

16. The bearing cage according to claim 9, wherein the first material is super-amphiphobic.

17. A rolling-element bearing comprising:

the bearing cage according to claim 10, a plurality of roller bodies respectively disposed in the pockets, and a lubricant, wherein the lubricant forms a contact angle of at least 90° when disposed on the first material.

18. The rolling-element bearing according to claim 17, wherein the lubricant forms a contact angle of at least 120° when disposed on the first material.

19. The rolling-element bearing according to claim 18, wherein the lubricant forms a contact angle of at least 150° when disposed on the first material.

20. The bearing cage according to claim 1, wherein the at least one second surface area of the annular structure is coated with an oleophilic material, a lipophilic material, or both an oleophilic material and a lipophilic material.

* * * * *